Patented Aug. 7, 1945

2,381,433

UNITED STATES PATENT OFFICE 2,381,433

ESTERS OF ENDOETHYLENE HYDROXYCY-CLOPENTANOINDANE AND METHOD FOR THEIR PREPARATION

Herman A. Bruson, Philadelphia, Pa., assignor to The Resinous Products & Chemical Company, Philadelphia, Pa., a corporation of Delaware No Drawing. Application April 19, 1944, Serial No. 531,763

14 Claims. (Cl. 260—486)

This invention deals with new esters derived from endomethylene tetrahydrofluorene by the catalyzed addition of organic carboxylic acids thereto with simultaneous rearrangement to form esters of endoethylene hydroxycyclopentanoindane.

According to this invention, organic carboxylic acids are reacted in the presence of acidic condensing agents with 1,4-endomethylene tetrahydrofluorene to form esters of endoethylene hydroxycyclopentanoindane by an addition-rearrangement reaction as follows:

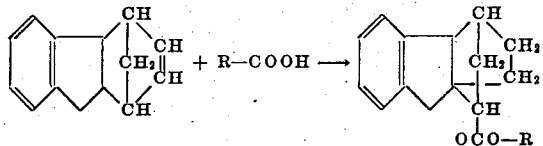

or

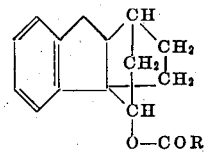

In the case of a polycarboxylic acid one or more molecules of 1,4-endomethylene tetrahydro-$\Delta^2$-fluorene may be reacted with each molecule of the acid. Thus, oxalic acid may react with one or two molecules of 1,4-endomethylene tetrahydro-$\Delta^2$-fluorene:

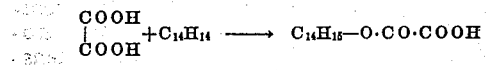

and

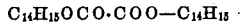

In the above reaction, $C_{14}H_{15}$— represents the endoethylene cyclopentanoindane radical.

In practicing this invention, it has been found that a wide variety of organic carboxylic acids containing one or more carboxyl groups may be employed. These may be aliphatic, arylaliphatic, cycloaliphatic, aromatic, hydroaromatic, or heterocyclic, and may be saturated, unsaturated, straight, or branched chain in character. It has also been established that the hydrocarbon radical of the acid may contain a wide variety of groups or substituents, for example halogen, cyano, thiocyano, nitro, keto, ether, acyloxy, alkoxy, aryloxy, hydroxy, or other suitable group.

Typical useful carboxylic acids for the purpose of this invention are the fatty acids such as formic, acetic, propionic, isobutyric, and their higher homologues including lauric, palmitic, or stearic, or unsaturated fatty acids such as crotonic, acrylic, methacrylic, sorbic, oleic, linoleic, and the like. Other acids such as glycollic, lactic, alpha-hydroxyisobutyric, ethoxyacetic, phenoxyacetic, chloroacetic, dichloroacetic, trichloroacetic, alpha-bromolauric, alpha-chlorostearic, alpha-chlorobutyric, phenylacetic, benzoic, naphthenic, and furoic are also typical of those which may be used. Among the dibasic acids succinic, maleic, phthalic, adipic, and sebacic are the most useful.

Among the acidic condensing agents or catalysts which serve to promote the addition-rearrangement of carboxyl-containing compounds with 1,4-endomethylene tetrahydro-$\Delta^2$-fluorene are boron trifluoride and its coordination complexes with oxygenated compounds such as ethers, as typified by $BF_3.C_2H_5O.C_2H_5$, carboxylic acids, as typified by $BF_3.2CH_3COOH$, fluoboric acid, dihydroxy-fluoboric acid, sulfuric acid, acid esters of sulfuric acid, such as ethyl acid sulfate, sulfonic acids such as toluene sulfonic acid or butyl sulfonic acid, and other strong acids.

Of these various catalysts boron trifluoride and its coordination catalysts, particularly those with ethers and carboxylic acids, are preferred. As examples of the coordination complexes there may be cited those with ethers, exemplified by $BF_3.C_2H_5O.C_2H_5$ and $BF_3.C_4H_9O.C_4H_9$; with carboxylic acids, typified by $BF_3.2CH_3COOH$; with carboxylic esters, exemplified by $$BF_3.2CH_3COOC_2H_5$$

with ketones, exemplified by $BF_3.CH_3COCH_3$; with alcohols, typified by $BF_3.C_4H_9OH$, and with water, which complex may be represented by the formula $BF_3.(H_2O)_x$, when $x$ is one or two.

The quantity of active catalyst employed may be varied over a wide range. Good results have been obtained with as little as two per cent of catalyst, based on the weight of the hydrocarbon, up to and exceeding a molar equivalent of catalyst per mol of hydrocarbon used.

The preferred temperature range is from about 50° C. to about 140° C. although both higher temperatures (e. g., 150°–200° C.) or lower temperatures, even room temperatures, may be used. Inert organic solvents such as ethylene dichloride or dioxane may be used, if desired, to facilitate the handling of the reaction mixture, particularly if the carboxylic acid used is a solid.

The following examples illustrate this invention, it being understood that the proportions, temperatures and time can be varied to a considerable extent.

Example 1

A mixture of 53 g. of 87% formic acid, 55 g. of 1,4-endomethylene tetrahydrofluorene, and 5 g. of 40% sulfuric acid was stirred at 95° C. for five and one-half hours. The cooled reaction product was then washed twice with water, then with dilute sodium carbonate solution, and finally with water, dried and distilled in vacuo. The formic acid ester of endoethylene hydroxycyclopentanoindane having the probable formula:

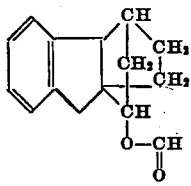

distilled over at 145°–150° C./1–2 mm. as a colorless, viscous oil in a yield of 59 grams. Upon redistillation, the pure compound boiled at 131°–134° C./1 mm.

Example 2

A mixture of 55 g. of 1,4-endomethylene tetrahydrofluorene, 100 g. of glacial acetic acid, and 4 g. of 50% sulfuric acid was stirred for five hours at 90°–92° C. The cooled reaction product was washed, neutralized, and dried as in Example 1, and distilled in vacuo.

The acetate of endoethylene hydroxycyclopentanoindane distilled over at 138°–142° C./1 mm. as a colorless, thick oil.

Example 3

A mixture of 55 g. of 1,4-endomethylene tetrahydrofluorene, 36.6 g. of benzoic acid, and 7 g. of $BF_3.O(C_4H_9)_2$ was stirred for five hours at 92° C., then cooled, washed with water and with dilute sodium hydroxide solution, dried, and distilled in vacuo.

The benzoate of endoethylene hydroxycyclopentanoindane boiled at 197°–202° C./0.5 mm. It was a very viscous balsam.

Example 4

A mixture of 23 g. of glycollic acid, 50 g. of 1,4-endomethylene tetrahydrofluorene, and 6 g. of $BF_3.O(C_2H_5)_2$ was stirred at 90°–95° C. for six hours and worked up as in Example 3. The glycollate of endoethylene hydroxycyclopentanoindane was a colorless balsam boiling at 185° C./1 mm.

Example 5

A mixture of 32 g. of 85% lactic acid, 5 g. of 98% sulfuric acid, and 54 g. of 1,4-endomethylene tetrahydrofluorene was stirred at 95° C. for six hours and worked up as in Example 3.

The lactate of endoethylene hydroxycyclopentanoindane was a viscous oil boiling at 175–180° C./1 mm.

Example 6

A mixture of 25.8 g. of crotonic acid, 55 g. of 1,4-endomethylene tetrahydrofluorene, and 6 g. of $BF_3.O(C_4H_9)_2$ was heated for two hours at 100°–118° C. The product was washed, dried, and distilled in vacuo, to give 49 g. of the crotonate of endoethylene hydroxycyclopentanoindane, as a very viscous, colorless oil boiling at 166° C./1 mm.

Example 7

A mixture of 29 g. of monochloroacetic acid, 55 g. of 1,4-endomethylene tetrahydrofluorene, and 2 g. of 40% sulfuric acid was heated at 95° C. for six hours. The cooled product was washed with water, dried, and distilled in vacuo.

The product having the probable formula

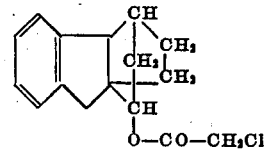

was a colorless oil boiling at 165°–170° C./1 mm.

When heated with sodium thiocyanate, it yields the corresponding thiocyanoacetoxyendoethylene cyclopentanoindane having valuable properties as an insecticidal toxicant.

Example 8

A mixture of 17.7 grams of succinic acid, 55 grams of 1,4-endomethylene tetrahydrofluorene, 50 g. of dioxane, and 5 grams of $BF_3.O(C_4H_9)_2$ was stirred for seven hours at 90°–95° C. The product was cooled and poured into water. The resulting thick, dark mass was taken up in benzene and washed with dilute sodium carbonate solution and water. The benzene was then evaporated off, first at atmospheric pressure and eventually in vacuo. The residual, thick oil consists essentially of the di-ester of succinic acid and endoethylene hydroxycyclopentanoindane.

The esters of this invention are of particular interest in the fields of plastics and coating compositions. They may serve as solvents, softeners, and plasticizers.

The presence of a phenyl ring in the products of this invention permits their reaction with nitrating, sulfonating, acylating, halogenating, and other reagents. This ring may be hydrogenated or used in Friedel-Crafts reactions. It may be alkylated with alcohols or olefines. The new esters may, therefore, serve as intermediates for a great number of hitherto unknown derivatives thereof.

I claim:

1. A method for preparing esters of endoethylene hydroxycyclopentanoindane which comprises reacting 1,4-endomethylene tetrahydro-Δ²-fluorene in the presence of an acidic condensing agent with a carboxylic acid.

2. A method for preparing esters of endoethylene hydroxycyclopentanoindane which comprises reacting 1,4-endomethylene tetrahydro-Δ²-fluorene in the presence of an acidic condensing agent with a monobasic carboxylic acid.

3. A method for preparing esters of endoethylene hydroxycyclopentanoindane which comprises reacting 1,4-endomethylene tetrahydro-Δ²-fluorene in the presence of a boron trifluoride catalyst with a carboxylic acid.

4. A method for preparing esters of endoethylene hydroxycyclopentanoindane which comprises reacting 1,4-endomethylene tetrahydro-Δ²-fluorene in the presence of a boron trifluoride catalyst with a monobasic carboxylic acid.

5. A method for preparing esters of endoethylene hydroxycyclopentanoindane which comprises reacting 1,4-endomethylene tetrahydro-Δ²-fluorene in the presence of an acidic condensing agent with an aliphatic monobasic carboxylic acid.

6. A method for preparing esters of endoethylene hydroxycyclopentanoindane which comprises reacting 1,4-endomethylene tetrahydro-Δ²-fluorene in the presence of an acidic condensing agent with monochloroacetic acid.

7. A method for preparing esters of endoethylene hydroxycyclopentanoindane which comprises reacting 1,4-endomethylene tetrahydro-$\Delta^2$-fluorene in the presence of an acidic condensing agent with acetic acid.

8. A method for preparing esters of endoethylene hydroxycyclopentanoindane which comprises reacting 1,4-endomethylene tetrahydro-$\Delta^2$-fluorene in the presence of an acidic condensing agent with crotonic acid.

9. As a new compound, an acid-catalyzed addition-rearrangement product from 1,4-endomethylene tetrahydro-$\Delta^2$-fluorene and a carboxylic acid, said compound being an ester of endoethylene hydroxycyclopentanoindane.

10. As a new compound, an acid-catalyzed addition-rearrangement product from 1,4-endomethylene tetrahydro-$\Delta^2$-fluorene and a monobasic carboxylic acid, said compound being a monoester of endoethylene hydroxycyclopentanoindane.

11. As a new compound, an acid-catalyzed addition-rearrangement product from 1,4-endomethylene tetrahydro-$\Delta^2$-fluorene and a monobasic, aliphatic carboxylic acid, said compound being a monoester of endoethylene hydroxycyclopentanoindane.

12. As a new compound, an acid-catalyzed addition-rearrangement product from 1,4-endomethylene tetrahydro-$\Delta^2$-fluorene and monochloroacetic acid, said compound being the monochloroacetate of endoethylene hydroxycyclopentanoindane.

13. As a new compound, an acid-catalyzed addition-rearrangement product from 1,4-endomethylene tetrahydro-$\Delta^2$-fluorene and acetic acid, said compound being the acetate of endoethylene hydroxycyclopentanoindane.

14. As a new compound, an acid-catalyzed addition-rearrangement product from 1,4-endomethylene tetrahydro-$\Delta^2$-fluorene and crotonic acid, said compound being the crotonate of endoethylene hydroxycyclopentanoindane.

HERMAN A. BRUSON.